(12) United States Patent
Avendano et al.

(10) Patent No.: US 6,910,665 B2
(45) Date of Patent: Jun. 28, 2005

(54) INTEGRATED REFRIGERATOR CABINET LEVELING AND DOOR CLOSING ASSEMBLY

(75) Inventors: Jose G. Avendano, Coal Valley, IL (US); Robert Stephen Mercille, O'Fallon, IL (US); Kurt C. Senner, Galesburg, IL (US)

(73) Assignee: Maytag Corporation, Newton, IA (US)

( * ) Notice: Subject to any disclaimer, the term of this patent is extended or adjusted under 35 U.S.C. 154(b) by 0 days.

(21) Appl. No.: 10/385,650

(22) Filed: Mar. 12, 2003

(65) Prior Publication Data

US 2004/0178305 A1 Sep. 16, 2004

(51) Int. Cl.[7] .............................. F16M 11/24; E05F 1/14
(52) U.S. Cl. ...................... 248/188.2; 312/405; 16/284; 49/286
(58) Field of Search ...................... 248/188.2; 312/405; 16/19, 286, 284; 49/386; 126/194

(56) References Cited

U.S. PATENT DOCUMENTS

| | | | | |
|---|---|---|---|---|
| 1,632,383 A | * | 6/1927 | Seiden et al. ............ | 248/188.4 |
| 2,189,818 A | | 2/1940 | Murrin | |
| 2,392,689 A | | 1/1946 | Peglow | |
| 2,758,454 A | | 5/1956 | Cossin | |
| 2,803,510 A | * | 8/1957 | Carbary ................. | 312/351.13 |
| 2,828,578 A | * | 4/1958 | McCabe .................. | 248/188.4 |
| 3,392,419 A | | 7/1968 | Stein et al. | |
| 3,842,542 A | | 10/1974 | White et al. | |
| 4,690,468 A | | 9/1987 | Lau | |
| 4,789,121 A | * | 12/1988 | Gidseg et al. ........... | 248/188.2 |
| 4,932,729 A | * | 6/1990 | Thompson et al. ......... | 312/405 |
| 4,955,569 A | * | 9/1990 | Hottmann ................ | 248/188.2 |
| 4,991,805 A | * | 2/1991 | Solak et al. ............ | 248/188.4 |
| 5,027,473 A | | 7/1991 | Hottmann | |
| 5,220,747 A | | 6/1993 | Cherry et al. | |
| 5,272,789 A | | 12/1993 | Mitchell et al. | |
| 5,500,984 A | | 3/1996 | Lee | |
| 5,522,656 A | | 6/1996 | Jenkins | |
| 5,579,606 A | * | 12/1996 | Kim ..................... | 49/386 |
| 5,749,550 A | * | 5/1998 | Jackson ................. | 248/188.2 |
| 5,896,619 A | * | 4/1999 | Koopman ................. | 16/50 |
| 5,931,554 A | * | 8/1999 | Koopman ................. | 312/405 |
| 6,408,482 B1 | * | 6/2002 | Henriott et al. ......... | 16/29 |

FOREIGN PATENT DOCUMENTS

GB 657388 9/1951

* cited by examiner

Primary Examiner—Anita M. King
(74) Attorney, Agent, or Firm—Diederiks & Whitelaw; Allan P. Orsund

(57) ABSTRACT

An integrated door closing and leveling assembly for a refrigerator includes a spring biased door closure and an adjustable support integrated into a housing. The door closure includes an arm attached to the housing for relative sliding and pivoting movement, while being biased to a retracted position by a spring having an associated noise dampening element. The interaction between the spring and the arm is such that the spring provides a small degree of resistance to any opening force and also serves to maintain the door fully open once the door is opened beyond a critical point. The support structure houses both front and rear wheels for maneuvering the refrigerator, and feet for leveling and supporting purposes.

26 Claims, 5 Drawing Sheets

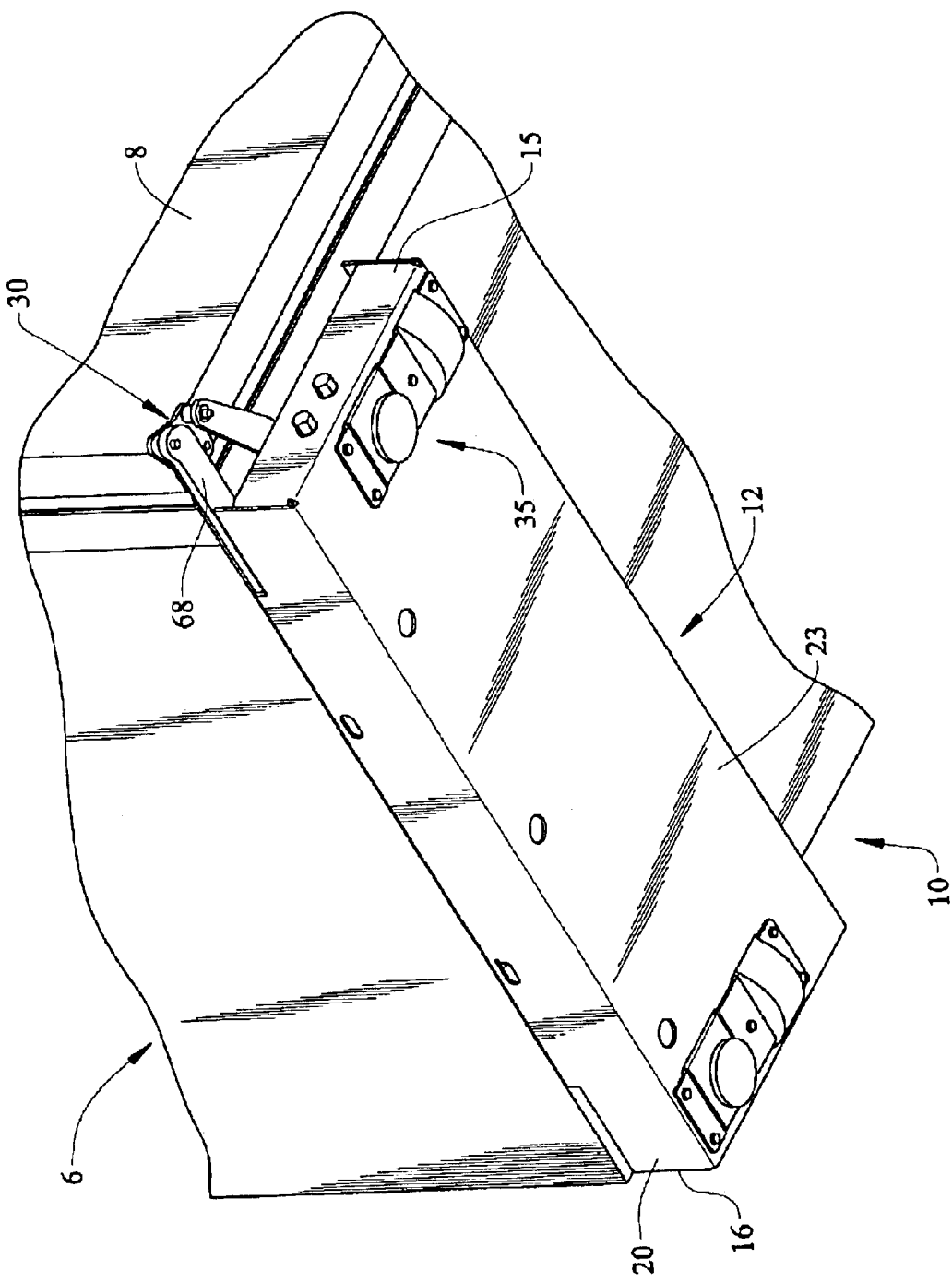

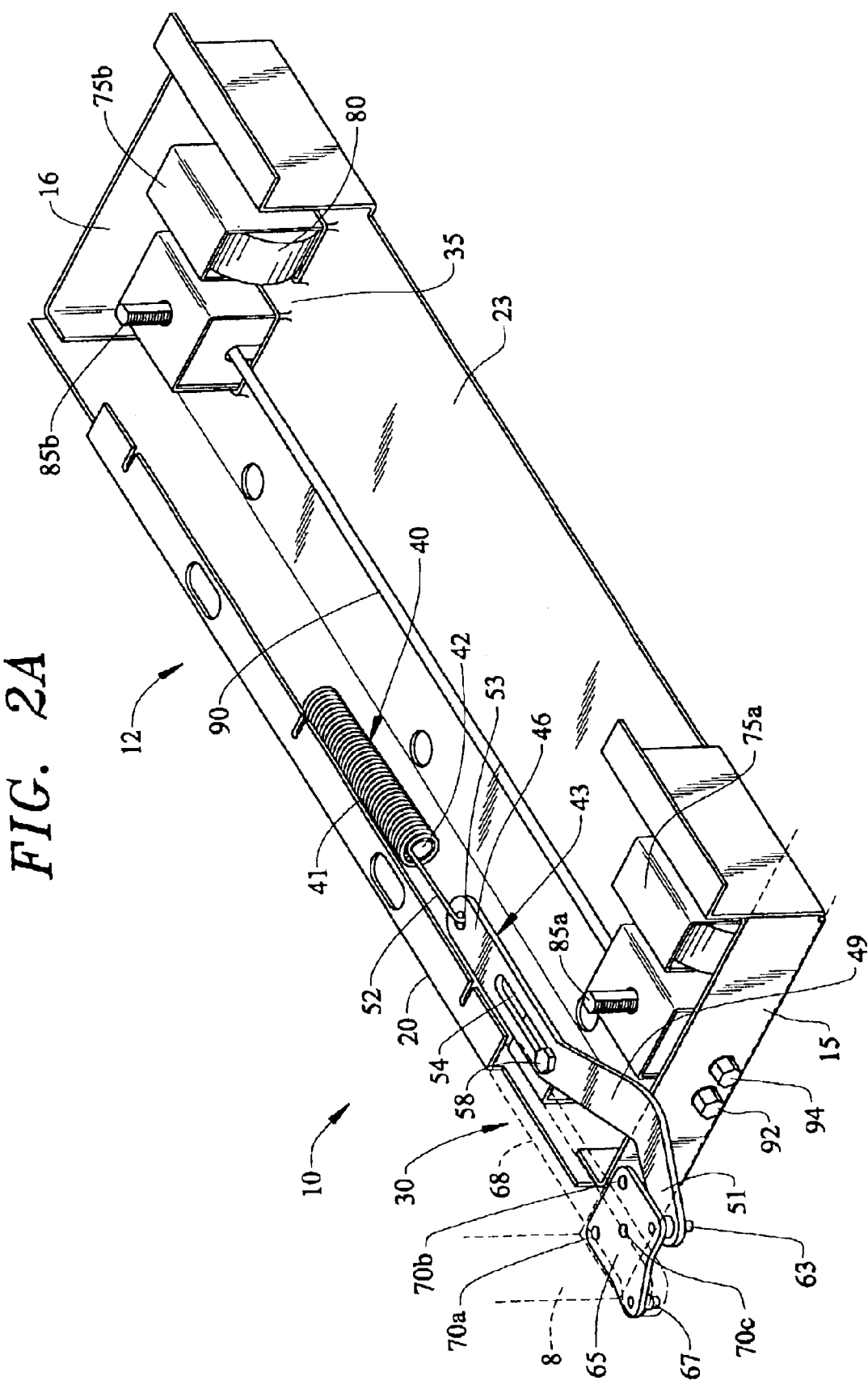

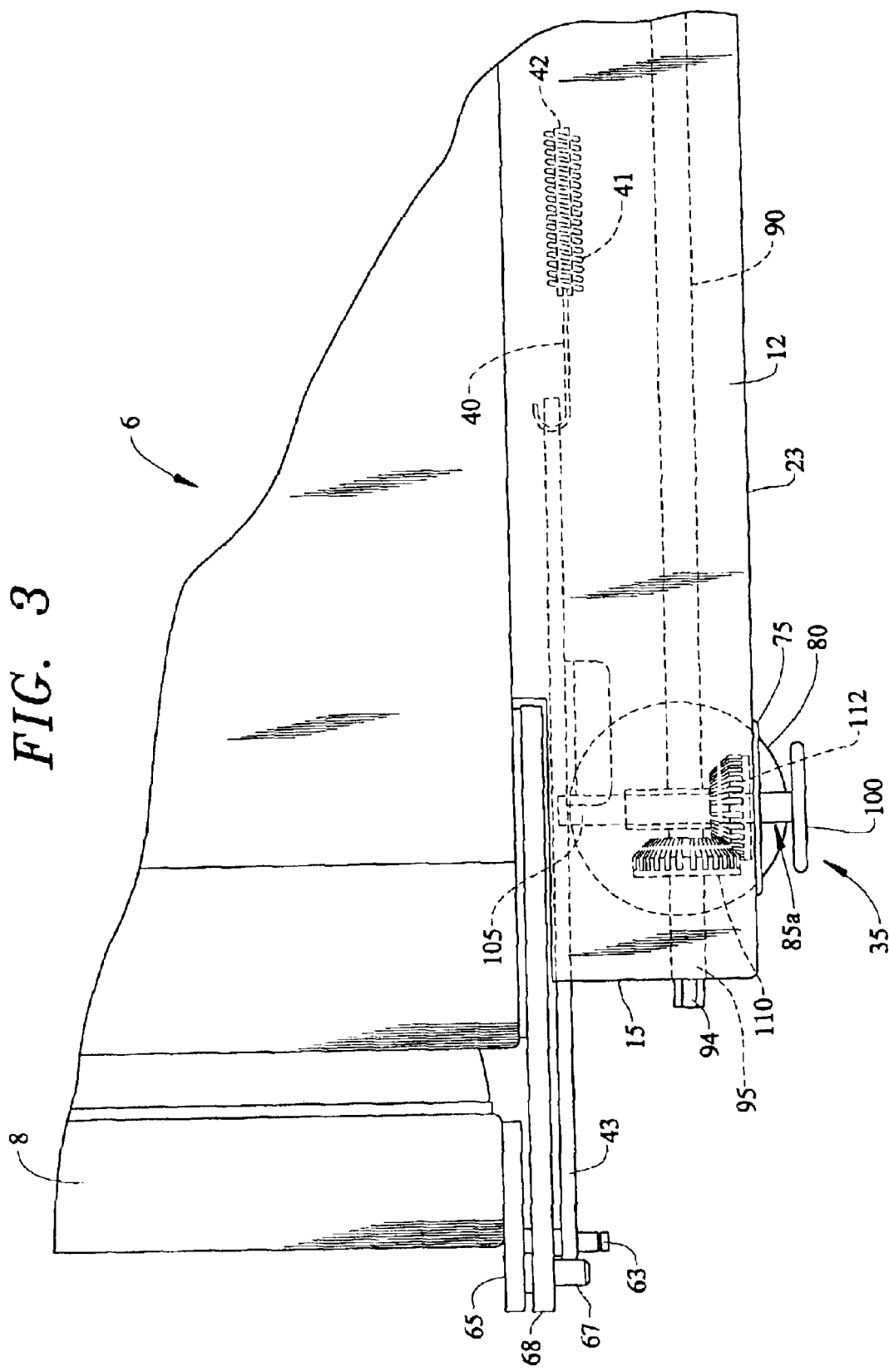

INTEGRATED REFRIGERATOR CABINET LEVELING AND DOOR CLOSING ASSEMBLY

BACKGROUND OF THE INVENTION

1. Field of the Invention

The present invention pertains to the art of refrigerators and, more particularly, to an assembly, adapted to be arranged beneath a refrigerator cabinet, which includes structure for automatically closing or selectively maintaining open a supported refrigerator door, as well as structure for leveling of the overall refrigerator cabinet.

2. Discussion of the Prior Art

In the construction of refrigerators, it known in the art to provide biased door closure devices. Essentially, a spring or another mechanism is employed to give a small degree of resistance when force is used open a refrigerator. Such a system is necessary to prevent inadvertent opening of the refrigerator. Additionally, the biased door closure device also functions to close the door when left in the open position. In traditional systems, an arm is affixed at one end to the refrigerator door and at the other end to a spring, which is then connected to a part of the refrigerator cabinet. When the door is closed, the spring is compressed and in its relaxed position. When the door is opened, the arm is moved such that the spring is stretched, thus providing a closing force.

With a simple straight arm, there is a constant force biasing the door closed. While this is useful to ensure that the door closes automatically to both conserve energy and prevent spoilage of food contained within the refrigerator, it is impossible to maintain the door in an open position without holding the door open. Nevertheless, it is often beneficial to be able to leave the refrigerator door open without either holding or propping the door open. For example, when loading many items into or taking many items out of the refrigerator, it is largely inconvenient to have to open the door repeatedly. Moreover, cleaning the interior of the refrigerator becomes difficult because the door is constantly closing on the person cleaning the refrigerator.

Altering the configuration of the arm from a straight length creates an over-center reaction in the door. For example, U.S. Pat. No. 2,392,689 to Peglow discloses a curved arm used in an automatic door closure. This arm is curved such that, when the door is closed, the included spring assists in maintaining the door closed. When the door it initially opened, the spring gives a small amount of resistance sufficient to re-close the door when the opening force is removed. However, because the arm is curved, when the door is opened beyond a certain angle or degree, the specific shape of the curved arm actually biases the arm to a more open position. As a result, the spring is stretched as the door opens to this point, and is allowed to compress when the door is opened beyond this point. Accordingly, because the spring compresses as the door is opened to its widest position, the spring biases the door open.

Because refrigerators are often quite heavy, providing a wheel or other rolling assembly is particularly advantageous. Therefore, it has become a customary practice to equip such heavy domestic appliances with wheel assemblies to enhance mobility. When provided with a supporting wheel assembly, a heavy refrigerator can be readily moved by a single person to prepare for installation, repair, cleaning and other purposes.

Often times, it is also desirable to permit some degree of vertical adjustability between the refrigerator and the supporting surface. Specifically, it is desirable to enable leveling of a refrigerator. While the majority of household appliances are generally positioned on surfaces which are relatively level, it has still been found beneficiary to provide some vertical adjustability of the wheel assemblies to ensure precise leveling of the refrigerator. This is particularly advantageous when applied to a typical refrigerator such that the front portion of the refrigerator can be slightly elevated to ensure that the doors will open and close as desired, and not hinder the action of included door springs.

However, each of the systems described above is separate and distinct from one another such that multiple systems must be separately integrated into a refrigerator cabinet during manufacturing. As a result, time and expense are required during manufacturing in order to correctly install those systems. Therefore, there exists a need in the art for a quickly and easily installable assembly incorporating the advantages of both an over-center door closure and a vertically adjustable support.

SUMMARY OF THE INVENTION

An integrated refrigerator cabinet leveling and door closing assembly particularly adapted to be integrated into a single sub-assembly is described herein. More particularly, the invention includes a housing for both a door closure assembly and an adjustable refrigerator support which, when fully assembled, can be placed below and affixed to a refrigerator cabinet as a unitary component.

Specifically, the assembly includes a spring mounted to the housing to provide a biasing force to the refrigerator door. An arm connects the spring to the door such that moving the door from the closed position stresses the spring. A dampening element is employed to reduce noise generated upon stressing the spring in this manner. The arm is particularly configured to provide an over-center door closure to provide a closing force until the door is opened a certain degree. The arm also includes an elongated slot through which a mechanical fastener extends to limit the movement of the arm during pivoting of the door. The position of the mechanical fastener is selected to allow the arm to shift as the fastener slides along the slot, while permitting limited rotational movement of the arm.

The assembly also incorporates a support structure including a fixed pair of wheels provided to allow the refrigerator cabinet to roll. A vertically adjustable foot is provided to prevent movement when fully extended. A bevel gear drive arrangement is used to selectively retract and extend the foot. An adjusting shaft extends from the bevel gear to the front of the assembly housing to allow for adjustment in the height of each of the feet without easy access thereto. Simply rotating the adjusting shaft moves the respective foot either up or down, depending upon the direction of rotation of the adjusting shaft. The feet can actually be adjusted to raise the wheels off the supporting surface. In any event, an integrated door closing and refrigerator support/leveling assembly is defined that can be advantageously pre-assembled and attached to the remainder of the refrigerator as a single unit.

Additional objects, features and advantages of the invention will become more readily apparent from the following detailed description of a preferred embodiment thereof when taken in conjunction with the drawings wherein like reference numerals refer to corresponding parts in the several views.

BRIEF DESCRIPTION OF THE DRAWINGS

FIG. 1 is a perspective view of an integrated refrigerator cabinet leveling and door closing assembly constructed in accordance the invention, with the assembly being attached to a refrigerator cabinet;

FIG. 2a is a perspective view of the integrated refrigerator cabinet leveling and door closing assembly, removed from the refrigerator cabinet with the door in the closed position;

FIG. 3 is a side view of the integrated assembly, with the assembly attached to a refrigerator cabinet.

DETAILED DESCRIPTION OF THE PREFERRED EMBODIMENT

Figure 2B:
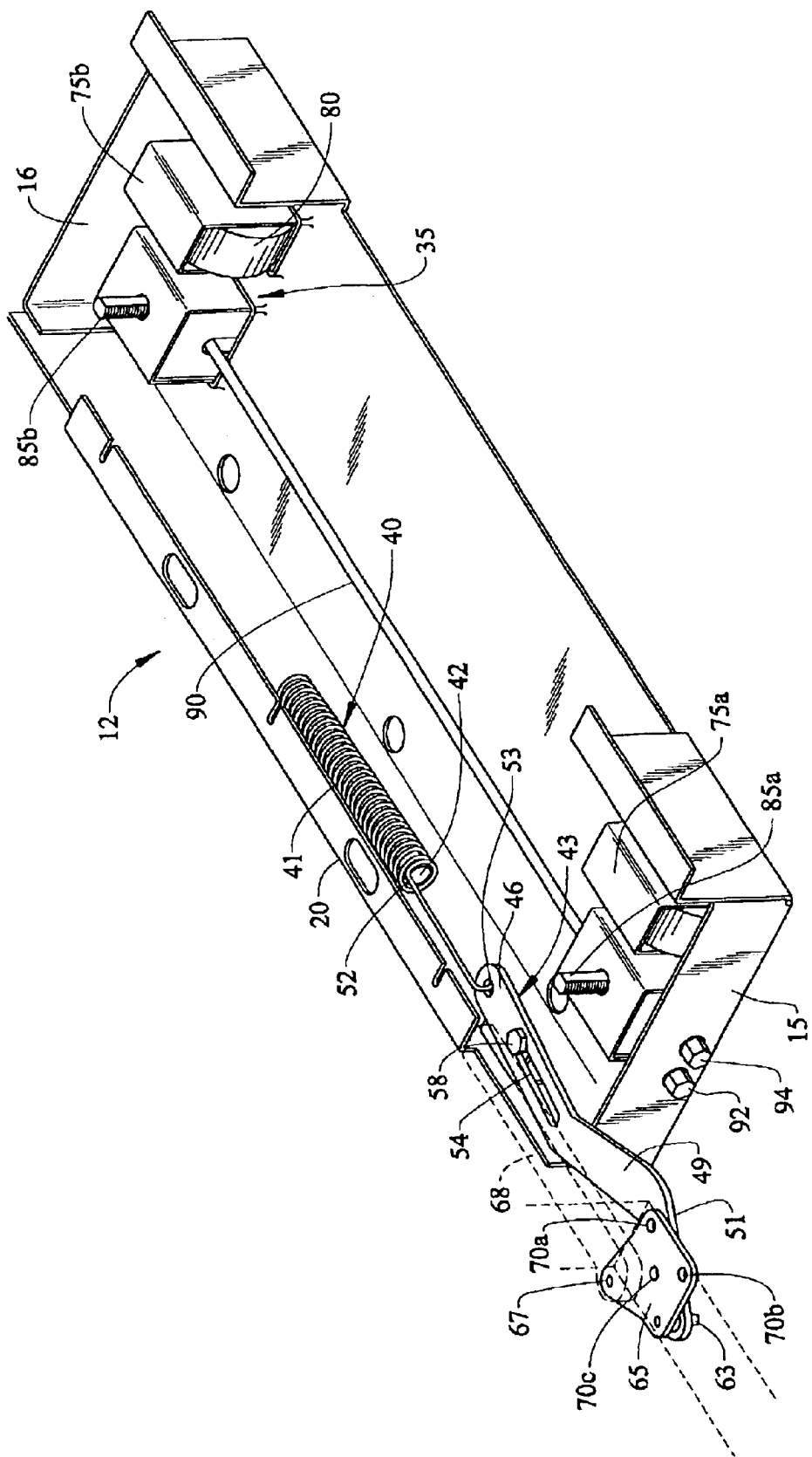
FIG. 2b is a perspective view of the integrated refrigerator cabinet leveling and door closing assembly, removed from the refrigerator cabinet with the door in the extreme open position.

With initial reference to FIGS. 1, 2A and 2B, a refrigerator cabinet 6 is partially shown with a door 8. Shown below cabinet 6 is a door closing and leveling assembly 10 constructed in accordance with the present invention. Assembly 10 includes a housing, generally indicated at 12, including a frontal plate 15, a rear plate 16, and lateral side plates 20, with a planar member 23 therebetween. A door closure structure 30, which is part of a door closing and leveling assembly 10 as will be more fully described below, is shown protruding from a space between housing 12 and door 8. Additionally, indicated at 35 is a leveling assembly, which will also be more fully described below. At this point it should be noted that FIG. 1 only illustrates door closing and leveling assembly 10 used in a preferred manner. As shown, refrigerator cabinet 6 is a traditional, domestic side-by-side refrigerator/freezer and, as such, a second door closing and leveling assembly, having a mirror image to assembly 10, would be used under the opposite side of cabinet 6.

FIGS. 2A and 2B show assembly 10 when door 8 is closed and open, respectively. Essentially, a tension spring 40, which includes a coiled section 41 having arranged therein a dampening element 42 preferably constituted by a substantially cylindrical foam member, is attached at one end to lateral side plate 20 of housing 12. The opposite end of spring 40 is attached to an arm 43. Arm 43 generally includes a straight length section 46, a first angled length section 49 and a second angled length section 51. Straight length section 46 and first angled length section 49 form an obtuse angle, while first angled length section 49 and second angled length section 51 form an acute angle. Spring 40 is attached to arm 43 via any standard connection, but is shown with an elongated end 52 of spring 40 inserted through an aperture 53 in straight length section 46 of arm 43.

Between the attachment with spring 40 and first angled length section 49, arm 43 is provided with an elongated slot 54. Slot 54 is of an oval shape and extends for a substantial length of straight length section 46. Inserted through slot 54 is a mechanical fastener 58. The opposite (hidden) end of fastener 58 is affixed to housing 12. Fastener 58 may be of any conventional form, but is most preferably a threaded fastener, such as a screw or bolt, with a large surface area head.

The opposite end of arm 43 is second angled length section 51. At the extreme end of angled length section 51, a pin/bushing 63 is used to connected arm 43 to a plate 65. Pin/bushing 63 essentially defines an axle (not separately labeled) extending completely through plate 65 and arm 43. Pin/bushing 63 also includes a conventional bearing surface to permit a low friction rotation of plate 65 relative to arm 43. A second pin/bushing 67 of substantially the same construction as pin/bushing 63 is used to connect a support bar 68 of cabinet 6 at a door pivot point on plate 65. Plate 65 also includes a plurality of fastener holes 70a, 70b and 70c which permit connection to door 8. Particularly, in the preferred embodiment, three fastener holes 70a, 70b and 70c are arranged in a triangular pattern to provide a secure link between plate 65 and door 8.

The operation of door closure assembly 30 will be described with specific reference to FIGS. 2A and 2B. Before door 8 is opened, spring 40 is in a relaxed state as shown in FIG. 2A. Accordingly, any movement of door 8 is resisted by the internal forces of spring 40. Fastener 58 is arranged in slot 54 at a position closest to first angled length section 49. The dashed lines above housing 12 indicate the location of door 8 relative to housing 6 in closed and opened positions respectively.

FIG. 2B shows the same structures as in FIG. 2A, but with door 8 in an open position. First, because plate 65 is affixed to door 8 at fastener holes 70a, 70b, 70c and plate 65 is supported by cabinet 6 for pivotal movement via pin/bushing 67, plate 65 rotates about pin/bushing 67 as door 8 is opened. As plate 65 rotates, arm 43 is pulled or extended because pin/bushing 63 connects arm 43 to plate 65. Because fastener 58 is fixed in slot 54 with respect to arm 43, movement of arm 43 causes relative movement between fastener 58 and slot 54. The specific structure of fastener 58 in slot 54 permits extension and retraction of arm 43, while allowing a degree of rotational movement about an axis defined by fastener 58. This is clearly illustrated in comparing the position of arm 43 in FIGS. 2A and 2B. More specifically, a comparison of the relative positions of arm 43 in FIGS. 2A and 2B reveals that arm 43 rotates as door 8 is opened. This rotational movement of arm 43 aids in establishing an over-center action necessary to provide a desired door-open biasing force. Specifically, due to the structure and movement of arm 43 as door 8 is opened, spring 40 is stretched until door 8 reaches a "critical point". Due to the presence of dampening element 42 provided within coiled section 41, unpleasant noises which could be generated during extension of spring 40 are minimized, and preferably eliminated. In accordance with the most preferred embodiment of the invention, dampening element 42 floats or slides within coiled section 41, while being compressed when spring 40 is stretched. Dampening element 42 can be retained in coiled section 41 in various ways, including the use of one or more clips, tape, or the like (not shown). Before this critical point, removing the door opening force will cause door closure structure 30 to return door 8 to the closed position. However, once door 8 has crossed the critical point, removal of the door opening force will result in door closing structure 30 forcing door 8 into a more open position.

FIGS. 2A and 2B additionally demonstrate the details of leveling assembly 35 in accordance with the invention. Adjacent to both frontal plate 15 and rear plate 16 are two support brackets 75a, 75b respectively. Each support bracket 75a, 75b serves as a foundation for a wheel 80 and a respective vertically adjustable foot 85a, 85b. An adjusting shaft 90 extends from foot 85b, through front plate 15, and terminates in a driving end 92. As will be more fully described below with reference to FIG. 3, driving end 92 is provided to allow for easy extension/retraction of rear foot 85b, relative to housing 12. A similar driving end 94 is associated with a shaft 95 and front foot 85a.

FIG. 3 indicates the configuration of support structure 35 in greater detail. While only the support structure closest to frontal plate 15 is detailed, it is understood that the support structure closer to rear plate 16 is identical in construction and operation. Extending below planar member 23 of housing 12 is a portion of foot 85a, which terminates in an enlarged, flat end 100. Flat end 100 is essentially constituted by a flat circular member which extends at a right angle to a threaded shaft 105. Shown protruding through frontal plate 15 is driving end 94 of adjusting shaft 95. Connected to the opposite end of driving end 94 is a convention bevel gear 110. The interrelation between bevel gear 110, adjusting shaft 95 and foot 85a is such that applying a rotational force to driving end 94 of adjusting shaft 95 causes bevel gear 110 to mesh with a second bevel gear 112 attached to threaded shaft 105 to cause vertical movement of foot 85a. As a result, flat end 100 is extended or retracted as driving end 94 is rotated. Because both adjusting shafts 90, 95 extend through frontal plate 15, each foot 85a, 85b can be independently adjusted even without gaining access to the rear of cabinet 6.

Figure 4:
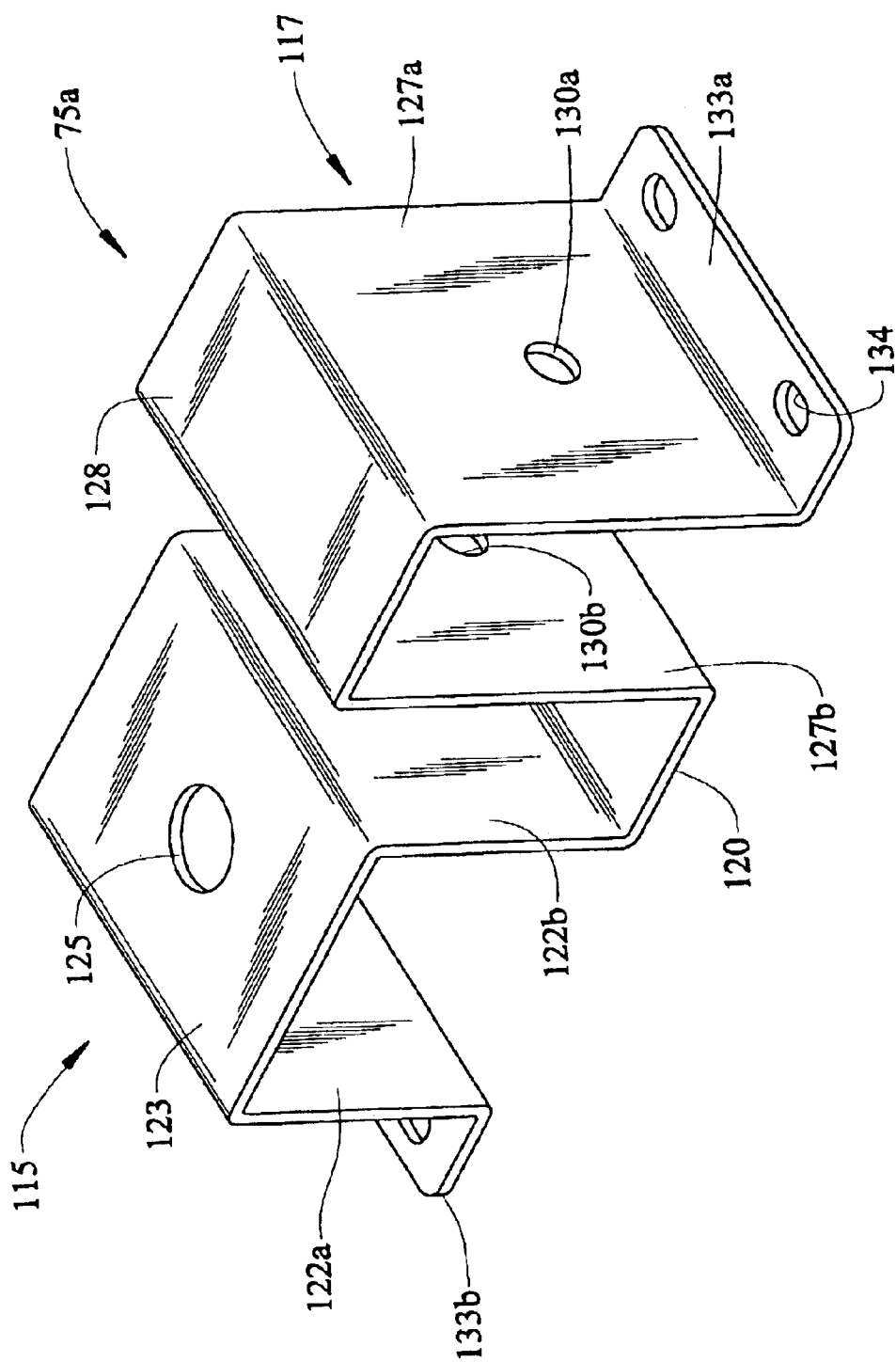
FIG. 4 is a perspective view of the support structure used in the invention.

FIG. 4 indicates the preferred construction of support bracket 75a. Of course, it is to be understood that support bracket 75b is correspondingly constructed. Essentially support bracket 75a includes a foot well 115 and a wheel well 117, both in the general shape of an open rectangular prism, with a well separator 120 therebetween. Foot well 115 includes two upstanding sides 122a, 122b, with a planar member 123 therebetween. A shaft aperture 125 is found in the center of planar member 123 for receiving threaded shaft 105 of respective foot 85a. Wheel well 117 also includes two upstanding sides 127a, 127b with a planar member 128 therebetween. Upstanding sides 127a and 127b each has a respective axle aperture 130a, 130b for receiving and supporting a respective wheel 80. Finally, bracket 75a includes a pair of wings 133a, 133b disposed on opposite sides of bracket 75. Wings 133 are designed with holes 134 into which screws, bolts or other fasteners are placed to secure bracket 75 to housing 12.

Leveling assembly 35 is designed to assist in moving and installing refrigerator cabinet 6. Before moving cabinet 6, adjusting shafts 90 and 95 are rotated to retract feet 85a and 85b off of the floor. Because wheels 80 extend below flat end 100 of feet 85a, 85b when feet 85a, 85b are fully retracted, wheels 80 support cabinet 6. This allows cabinet 6 to roll on wheels 80. Cabinet 6 may then be placed in a desired location. Once cabinet 6 has been properly positioned, adjusting shafts 90 and 95 are rotated to extend feet 85a and 85b. That is, shafts 90 and 95 are rotated until each flat end 100 rests completely against the support surface below cabinet 6. Once each of the flat ends 100 is supporting weight of cabinet 6, the height of each foot 85a, 85b may be altered independently by rotating respective adjusting shafts 90, 95 to provide a final leveling of cabinet 6.

As should be apparent from the above description, the cabinet leveling and door closing assembly 10 of the present invention provides an extremely compact arrangement that can be advantageously pre-assembled and then secured as an integrated unit to refrigerator cabinet 6 and door 8. Assembly 10 combines structure used in supporting refrigerator 6 and door 8 for movement over a supporting surface, stabilizing refrigerator 6 in a desired, leveled condition, and controlling the opening and closing of door 6. Although described with reference to a preferred embodiment, it should readily understood that various changes and/or modifications could be made to the invention without departing from the spirit thereof. For example, it should be understood that housing 12 may cover the entire lower surface of cabinet 6, such that only one door closing and leveling assembly 11 is necessary. In addition, spring 40 need not be mounted to the specific location in housing 12 shown and described, as any location capable of providing the necessary support is sufficient. In any event, the invention is only intended to be limited by the scope of the following claims.

We claim:

1. In a refrigerator having a cabinet, a refrigerator cabinet leveling and door closing assembly comprising:

a housing mounted to an underside of said refrigerator cabinet;

a support member defining a door pivot axis, said support member projecting from the refrigerator cabinet at a position spaced from the door pivot axis;

a plate member mounted to the support member for pivotal movement about the door pivot axis;

a door having an open position, a closed position and a plurality of non-discrete positions therebetween, said door being fixedly connected to said plate member;

an elongated arm having first and second end portions, said first end portion being attached to said plate member at a position offset from said door pivot axis, said arm including a longitudinally extending slot between the first and second end portions;

a fastener connecting the arm to said housing, said fastener extending through said slot;

a spring having one end attached to said housing and an opposing end attached to said arm; and at least one support element projecting from the housing for supporting the refrigerator cabinet upon a surface.

2. The assembly according to claim 1, wherein said elongated arm includes an angled section between the first and second end portions.

3. The assembly according to claim 2, wherein the slot is entirely provided in the second end portion.

4. The assembly according to claim 3, wherein the arm is capable of sliding and pivoting relative to the fastener.

5. The assembly according to claim 4, wherein the fastener defines a pivot axis for the arm.

6. The assembly according to claim 1, wherein the at least one support element constitutes part of a leveling assembly carried by said housing.

7. The assembly according to claim 6, wherein the support element constitutes a vertically adjustable foot member.

8. The assembly according to claim 7, wherein the leveling assembly further includes at least one wheel projecting below the housing.

9. The assembly according to claim 8, further comprising: a single support bracket for interconnecting each of the foot member and the wheel to the housing.

10. The assembly according to claim 1, further comprising: a dampening element, attached to the spring, for minimizing noises generated upon stretching of the spring.

11. The assembly according to claim 10, wherein the spring includes a coiled section, said dampening element being arranged within the coiled section.

12. The assembly according to claim 11, wherein the dampening element is slidably mounted within the coiled section.

13. A refrigerator cabinet leveling and door closing assembly comprising:

a housing including interconnected front and lateral side plates with a planar member therebetween;

a biased door closing assembly mounted to said housing; and a refrigerator support structure extending through said planar member of said housing, wherein said refrigerator cabinet leveling and door closing assembly is preassembled into an integrated unit and adapted to be attached to a refrigerator cabinet as a unitary component.

14. The assembly according to claim 13, further comprising: means for shifting the refrigerator support structure relative to the housing, said refrigerator cabinet leveling and door closing assembly being adapted to be mounted to an underside of the refrigerator cabinet, with the biased door closure assembly being attached to a door of the refrigerator cabinet and the support structure being adjustable for leveling the refrigerator cabinet.

15. The assembly according to claim 13, wherein said refrigerator support structure includes a vertically adjustable, leveling foot member.

16. The assembly according to claim 15, wherein said refrigerator support structure includes a wheel.

17. The assembly according to claim 16, further comprising: a single support bracket for interconnecting each of the foot member and the wheel to the housing.

18. A refrigerator cabinet leveling and door closing assembly comprising:

a housing including interconnected lateral side plates with a planar member therebetween;

a biased door closing assembly mounted to said housing;

a refrigerator support structure extending through said planar member of said housing, wherein said refrigerator cabinet leveling and door closing assembly is adapted to be attached to a refrigerator cabinet as an integrated unit;

a support member defining a door pivot axis, said support member projecting from the refrigerator cabinet at a position spaced from the door pivot axis;

a plate member mounted to the support member for pivotal movement about the door pivot axis;

an elongated arm having first and second end portions, said first end portion being attached to said plate at a position offset from said door pivot axis, said arm including a longitudinally extending slot between the first and second end portions;

a fastener attached to said housing through said slot; and a spring having one end attached to said housing and an opposing end attached to said arm.

19. The assembly according to claim 18, wherein said elongated arm includes an angled section between the first and second end portions.

20. The assembly according to claim 19, wherein the arm is capable of sliding and pivoting relative to the fastener.

21. The assembly according to claim 20, wherein the fastener defines a pivot axis for the arm.

22. The assembly according to claim 18, wherein said refrigerator support structure includes at least one vertically adjustable, leveling foot member and at least one wheel.

23. The assembly according to claim 22, further comprising: a single support bracket for interconnecting each of the foot member and the wheel to the housing.

24. The assembly according to claim 18, further comprising: a dampening element, attached to the spring, for minimizing noises generated upon stretching of the spring.

25. The assembly according to claim 24, wherein the spring includes a coiled section, said dampening element being arranged within the coiled section.

26. The assembly according to claim 25, wherein the dampening element is slidably mounted within the coiled section.

* * * * *